(12) United States Patent
Florez

(10) Patent No.: US 10,232,450 B1
(45) Date of Patent: Mar. 19, 2019

(54) HOLE SAW WITH PROPERTIES TO ALLOW FOR EASY REMOVAL OF SAWED-OFF MATERIALS

(71) Applicant: Carlos Florez, Miramar, FL (US)

(72) Inventor: Carlos Florez, Miramar, FL (US)

(*) Notice: Subject to any disclaimer, the term of this patent is extended or adjusted under 35 U.S.C. 154(b) by 0 days.

(21) Appl. No.: 15/900,813

(22) Filed: Feb. 21, 2018

(51) Int. Cl.
*B23B 51/04* (2006.01)
(52) U.S. Cl.
CPC ...... *B23B 51/0473* (2013.01); *B23B 51/0426* (2013.01); *B23B 51/04* (2013.01); *B23B 51/0453* (2013.01)
(58) Field of Classification Search
CPC . B23B 51/04; B23B 51/0426; B23B 51/0406; B23B 51/0453; B23B 51/0473
See application file for complete search history.

(56) References Cited

U.S. PATENT DOCUMENTS 2,480,595 A * 8/1949 Moyer ............... B23B 51/0473
279/83

* cited by examiner

*Primary Examiner* — Daniel Howell
*Assistant Examiner* — Paul M Janeski
(74) *Attorney, Agent, or Firm* — The Iwashko Law Firm, PLLC; Lev Ivan Gabriel Iwashko

(57) ABSTRACT

A hole saw, including a rotatable drill bit, a plurality of rotatable saw jaws disposed around the drill bit to encase at least a portion of the drill bit therewithin when the rotatable saw jaws are in a closed position, a fixed locking collar portion disposed at base ends of the plurality of rotatable saw jaws, and a movable locking collar portion to move with respect to the fixed locking collar portion, such that the plurality of rotatable saw jaws pivot away from each other into an open position as the movable locking collar portion moves away from the fixed locking collar portion.

8 Claims, 4 Drawing Sheets

HOLE SAW WITH PROPERTIES TO ALLOW FOR EASY REMOVAL OF SAWED-OFF MATERIALS

BACKGROUND

1. Field

The present general inventive concept relates generally to a hole saw, and more particularly, to a hole saw with properties to allow for easy removal of sawed-off materials.

2. Description of the Related Art

During construction, the use of a hole saw is often necessary to create an opening in a work piece and cut up core material. However, multiple tools are often required to completely remove the piece, causing clutter and hassle.

Therefore, there is a need for an enhanced tool to replace the use of a regular hole saw in order to more effectively cut into any material, including wood, steel, aluminum, etc., with just one device.

There is also a need for a tool that allows a sawed-off piece of material to be easily removed from the tool.

SUMMARY

The present general inventive concept provides a hole saw with properties to allow for easy removal of sawed-off materials.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a hole saw, including a rotatable drill bit, a plurality of rotatable saw jaws disposed around the drill bit to encase at least a portion of the drill bit therewithin when the rotatable saw jaws are in a closed position, a fixed locking collar portion disposed at base ends of the plurality of rotatable saw jaws, and a movable locking collar portion to move with respect to the fixed locking collar portion, such that the plurality of rotatable saw jaws pivot away from each other into an open position as the movable locking collar portion moves away from the fixed locking collar portion.

The hole saw may further include a threaded portion to allow the movable locking collar portion to move in first and second directions with respect to the fixed locking collar portion.

The plurality of rotatable saw jaws may pivot away from each other into the open position as the movable locking collar portion moves along the threaded portion in the first direction.

The first direction may be away from the fixed locking collar portion.

The plurality of rotatable saw jaws may pivot towards each other into the closed position as the movable locking collar portion moves along the threaded portion in the second direction.

The second direction may be toward the fixed locking collar portion.

The hole saw may further include a hex shaft to be inserted into a drill to allow the drill bit and the plurality of saw jaws to rotate when the drill is operated.

The hole saw may further include a plurality of pins connected to the fixed locking collar portion at first ends thereof and to base end portions of the plurality of saw jaws at second ends thereof, such that the plurality of saw jaws pivot via the plurality of pins.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION OF THE INVENTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
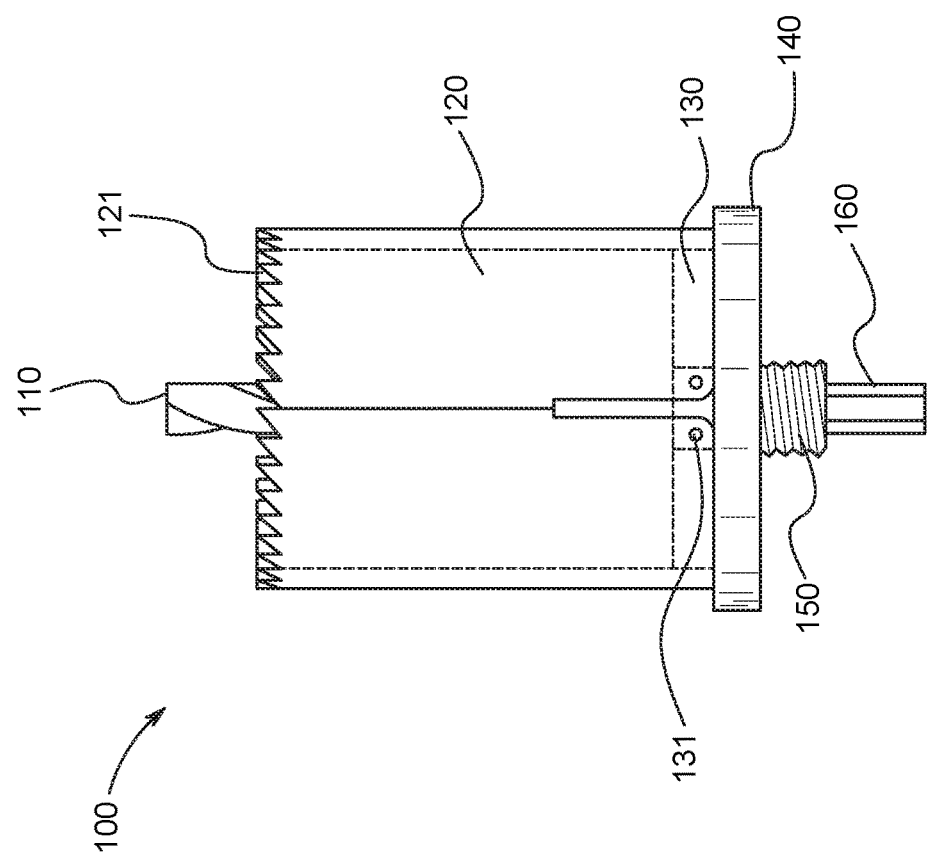
FIG. 1 illustrates a side view of a hole saw in a closed position, according to an exemplary embodiment of the present general inventive concept.

FIG. 1 illustrates a side view of a hole saw 100 in a closed position, according to an exemplary embodiment of the present general inventive concept.

Figure 2:
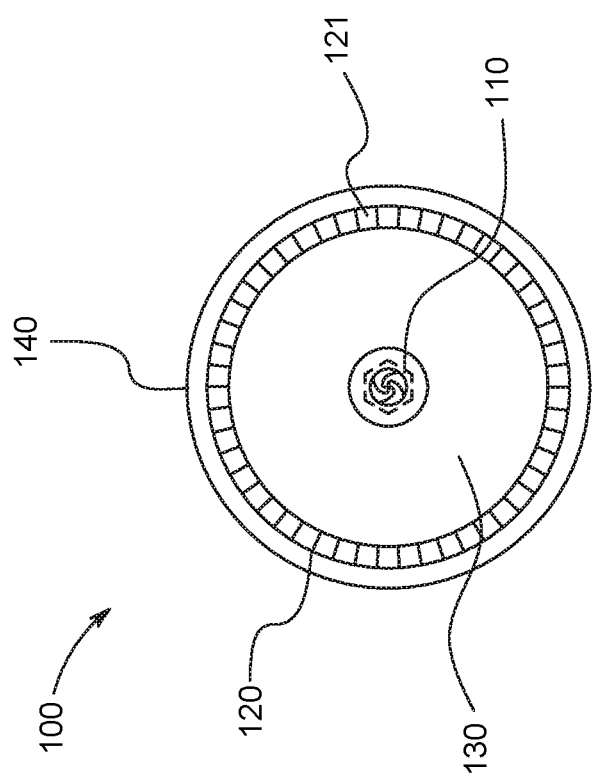
FIG. 2 illustrates a top view of a hole saw in a closed position, according to an exemplary embodiment of the present general inventive concept.

FIG. 2 illustrates a top view of the hole saw 100 in the closed position, according to an exemplary embodiment of the present general inventive concept.

Figure 3:
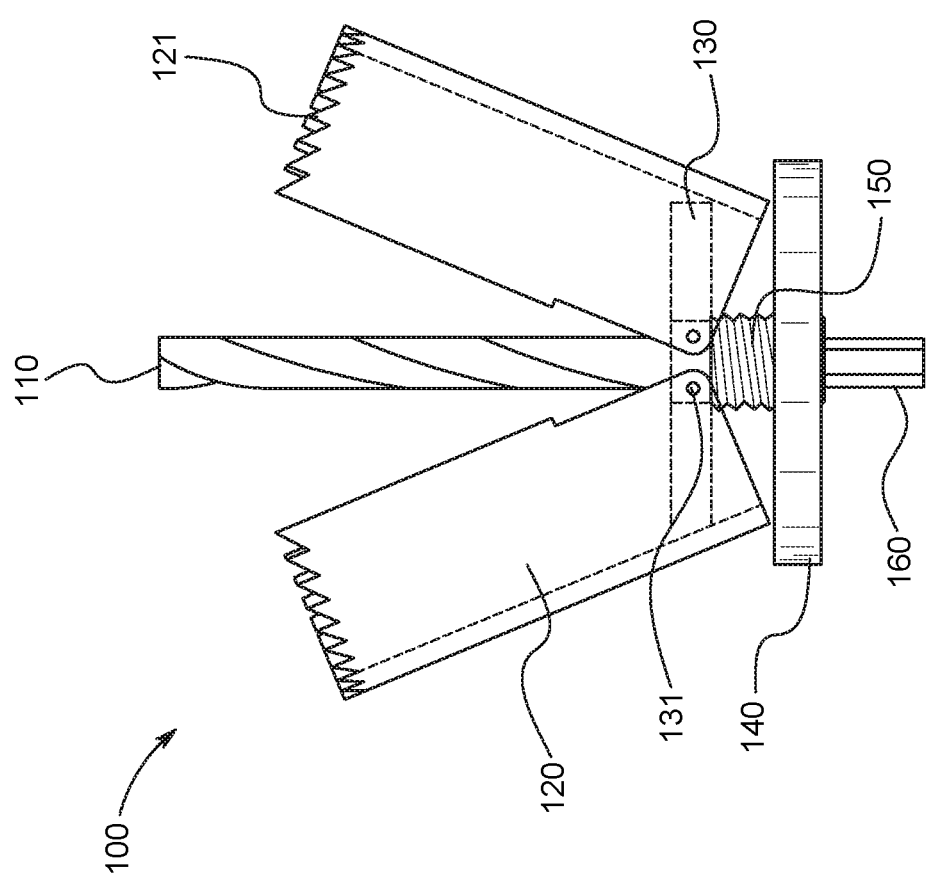
FIG. 3 illustrates a side view of a hole saw in an open position, according to an exemplary embodiment of the present general inventive concept.

FIG. 3 illustrates a side view of the hole saw 100 in an open position, according to an exemplary embodiment of the present general inventive concept.

Figure 4:
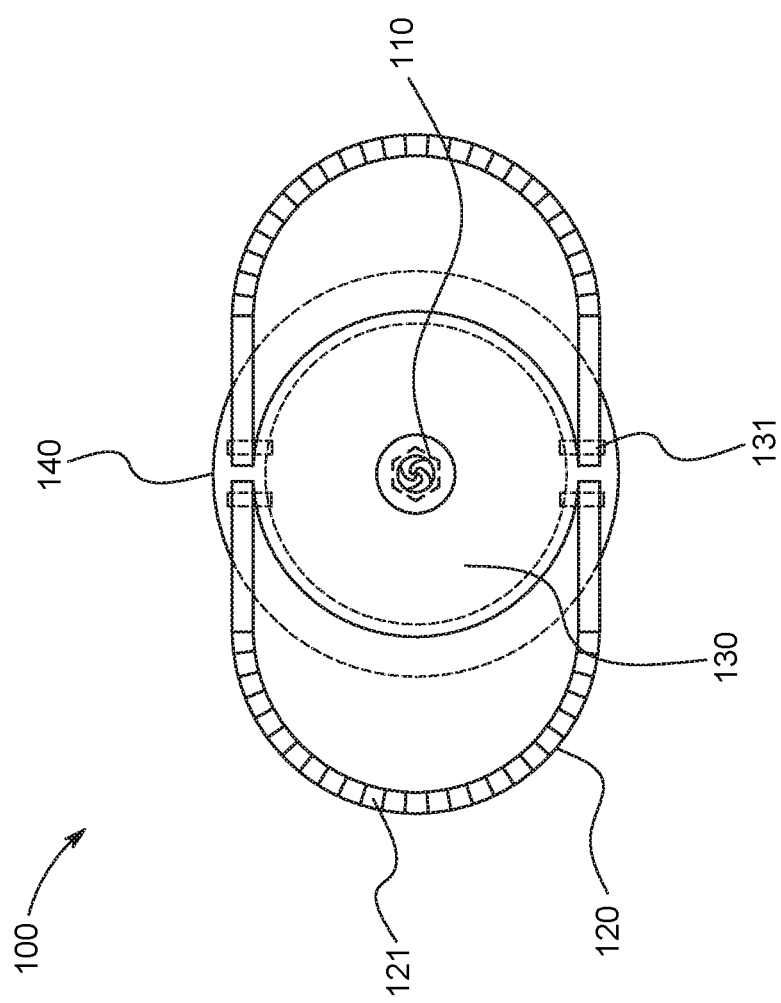
FIG. 4 illustrates a top view of a hole saw in an open position, according to an exemplary embodiment of the present general inventive concept.

FIG. 4 illustrates a top view of the hole saw 100 in the open position, according to an exemplary embodiment of the present general inventive concept.

The hole saw 100, and components thereof, may be constructed from metal, rubber, wood, plastic, silicone, glass, or any other material known to one of ordinary skill in the art. However, it is preferable that the hole saw 100, and components thereof, be constructed from very hard and durable materials that may cut through other materials.

Referring to FIG. 1, the hole saw 100 may include a drill bit 110, a plurality of saw jaws 120, a fixed locking collar portion 130, a movable locking collar portion 140, a threaded portion 150, and a hex shaft 160, but is not limited thereto.

The drill bit 110 and the plurality of saw jaws 120 may be rotatable.

Referring to FIGS. 1 and 2, the drill bit 110 may be disposed in a center portion of the hole saw 100, and may be surrounded and enclosed by the plurality of saw jaws 120 when the plurality of saw jaws 120 are in a closed position. However, even when the plurality of saw jaws 120 are in the closed position, a portion of the drill bit 110 may protrude outward past the plurality of saw jaws 120.

The plurality of saw jaws 120 may include a saw portion 121 that may be formed as a jagged and/or sharpened portion that may easily cut through material such as wood, metal, plastic, etc.

The fixed locking collar portion 130 be disposed at a base portion of the plurality of saw jaws 120, and may have a plurality of pins 131 fixedly attached thereto at first ends of the plurality of pins 131. The plurality of saw jaws 120 may be pivotably attached to second ends of the plurality of pins 131.

The movable locking collar portion 140 may be moved up and down (i.e., toward and away from) the fixed locking collar portion 130. More specifically, the movable locking collar portion 140 may be rotated in a first direction along the threaded portion 150, such that the movable locking collar portion 140 moves away from the fixed locking collar portion 130. When the movable locking collar portion 140 moves away from the fixed locking collar portion 130, the plurality of saw jaws 120 may open, such that the plurality of saw jaws 120 pivot outwards away from each other using the plurality of pins 131 as fulcrum points.

The movable locking collar portion 140 may also be rotated in a second direction along the threaded portion 150, such that the movable locking collar portion 140 moves toward the fixed locking collar portion 130. When the movable locking collar portion 140 moves toward the fixed locking collar portion 130, the plurality of saw jaws 120 may close, such that the plurality of saw jaws 120 pivot inward towards each other using the plurality of pins 131 as fulcrum points.

Referring to FIGS. 1 and 2, in order to utilize the hole saw 100, the hex shaft 160 may be inserted into a drill (not illustrated). When the drill is operated and the plurality of saw jaws 120, the drill bit 110 and the plurality of saw jaws 120 may rotate in order to cut into a material such as wood, metal, plastic, etc.

Referring to FIGS. 3 and 4, after the drill is no longer operated, if there is a piece of material stuck on the drill bit 110 or between the plurality of saw jaws 120, the movable locking collar portion 140 may be rotated with respect to the fixed locking collar portion 130 such that the movable locking collar portion 140 moves down the threaded portion 150. As the movable locking collar portion 140 moves down the threaded portion 150, the plurality of saw jaws 120 may pivot outwards via the plurality of pins 131, such that the plurality of saw jaws 120 open to allow the stuck material to be easily extracted.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A hole saw, comprising:
   a rotatable drill bit;
   a plurality of rotatable saw jaws disposed around the drill bit to encase at least a portion of the drill bit therewithin when the rotatable saw jaws are in a closed position;
   a fixed locking collar portion disposed at base ends of the plurality of rotatable saw jaws; and
   a movable locking collar portion to move with respect to the fixed locking collar portion, such that the plurality of rotatable saw jaws pivot away from each other into an open position as the movable locking collar portion moves away from the fixed locking collar portion.

2. The hole saw of claim 1, further comprising:
   a threaded portion to allow the movable locking collar portion to move in first and second directions with respect to the fixed locking collar portion.

3. The hole saw of claim 2, wherein the plurality of rotatable saw jaws pivot away from each other into the open position as the movable locking collar portion moves along the threaded portion in the first direction.

4. The hole saw of claim 3, wherein the first direction is away from the fixed locking collar portion.

5. The hole saw of claim 2, wherein the plurality of rotatable saw jaws pivot towards each other into the closed position as the movable locking collar portion moves along the threaded portion in the second direction.

6. The hole saw of claim 5, wherein the second direction is toward the fixed locking collar portion.

7. The hole saw of claim 1, further comprising:
   a hex shaft to be inserted into a drill to allow the drill bit and the plurality of saw jaws to rotate when the drill is operated.

8. The hole saw of claim 1, further comprising:
   a plurality of pins connected to the fixed locking collar portion at first ends thereof and to base end portions of the plurality of saw jaws at second ends thereof, such that the plurality of saw jaws pivot via the plurality of pins.

* * * * *